United States Patent
Yeh et al.

(10) Patent No.: US 10,851,830 B1
(45) Date of Patent: Dec. 1, 2020

(54) CONNECTING ROD STRUCTURE

(71) Applicant: PEGATRON CORPORATION, Taipei (TW)

(72) Inventors: Chun-Liang Yeh, Taipei (TW); Kuo-Jung Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/826,954

(22) Filed: Mar. 23, 2020

(30) Foreign Application Priority Data

May 29, 2019 (TW) .............................. 108206767 U

(51) Int. Cl.
F16C 7/02 (2006.01)
F16C 7/06 (2006.01)

(52) U.S. Cl.
CPC ...................................... F16C 7/06 (2013.01)

(58) Field of Classification Search
CPC ...... F16C 3/02; F16C 3/03; F16C 3/12; F16C 3/28; F16C 7/06; B62D 7/163
See application file for complete search history.

(56) References Cited

U.S. PATENT DOCUMENTS

| | | | | |
|---|---|---|---|---|
| 2,837,934 A | * | 6/1958 | Edmundson | F02N 15/00 74/586 |
| 3,318,099 A | * | 5/1967 | Sugden | E21D 11/183 405/153 |
| 3,617,078 A | * | 11/1971 | Valukonis | F16B 7/22 403/341 |
| 3,745,853 A | * | 7/1973 | Deibel | B60S 1/24 74/586 |
| 3,782,221 A | * | 1/1974 | Nalodka | F16C 7/06 74/586 |
| 6,038,942 A | * | 3/2000 | Gabas | F16C 1/14 192/111.11 |

(Continued)

FOREIGN PATENT DOCUMENTS

| | | |
|---|---|---|
| CN | 105434025 | 3/2016 |
| DE | 3537145 | 10/1986 |

(Continued)

OTHER PUBLICATIONS

"Search Report of Europe Counterpart Application", dated Sep. 21, 2020, p. 1-p. 8.

*Primary Examiner* — Adam D Rogers
(74) *Attorney, Agent, or Firm* — J.C. Patents

(57) ABSTRACT

A connecting rod structure includes a first rod, a second rod and a locking element. The first rod includes a first rod portion, a first and a second limiting portion. The first and the second limiting portion extend from a side of the first rod portion, and are spaced apart. The first limiting portion has a first through hole, and the second limiting portion has a second through hole. The second rod includes a second rod portion and a positioning portion. The positioning portion has a through groove, and is located between the first and the second limiting portion. An inner diameter of the through groove is greater than that of the first and the second through hole. The locking element passes through the first through hole, the through groove and the second through hole, to lock the first rod and the second rod together.

9 Claims, 5 Drawing Sheets

(56) References Cited

U.S. PATENT DOCUMENTS

| | | | | |
|---|---|---|---|---|
| 6,273,631 | B1 * | 8/2001 | Takahashi | F16C 7/06 |
| | | | | 403/104 |
| 6,612,594 | B2 * | 9/2003 | Engels | B62D 7/16 |
| | | | | 280/93.502 |
| 7,472,627 | B2 * | 1/2009 | Skelton | F16C 7/06 |
| | | | | 403/379.3 |
| 8,770,602 | B1 * | 7/2014 | Belleau | B62D 7/20 |
| | | | | 280/93.51 |
| 9,732,786 | B2 * | 8/2017 | Trotter | B60G 7/003 |

FOREIGN PATENT DOCUMENTS

| | | | | |
|---|---|---|---|---|
| FR | 2651285 | A1 * | 3/1991 | F16C 7/06 |
| FR | 2705744 | A1 * | 12/1994 | E05B 79/12 |
| GB | 2344400 | | 6/2000 | |
| TW | I653126 | | 3/2019 | |

* cited by examiner

US 10,851,830 B1

CONNECTING ROD STRUCTURE

CROSS-REFERENCE TO RELATED APPLICATION

This application claims the priority benefit of Taiwan application serial no. 108206767, filed on May 29, 2019. The entirety of the above-mentioned patent application is hereby incorporated by reference herein and made a part of this specification.

BACKGROUND

Technical Field

The present disclosure relates to a connecting rod structure and, in particular, to a connecting rod structure with adjustable length.

Related Art

A connecting rod structure is usually found in a steering device, a positioning device, an automated device, a transmission device or other mechanized devices. The connecting rod structure is mostly composed of a plurality of rods, and a length of each rod is fixed. If the length of the connecting rod structure is to be changed, some rods need to be replaced. This process is time-consuming and easily results in an assembly error. Although a telescopic rod group is proposed, a telescopic mechanism and a locking mechanism of the existing telescopic rod group are not perfect. Consequently, when two rods of the telescopic rod group slide relative to each other, the two rods may be skewed. Alternatively, after the two rods are locked together, there is still a margin of relative sliding between the two rods.

SUMMARY

The present disclosure provides a connecting rod structure whose length is adjustable and having good reliability.

The connecting rod structure in the present disclosure includes a first rod, a second rod and a locking element. The first rod includes a first rod portion, a first limiting portion and a second limiting portion. The first limiting portion and the second limiting portion extend from a side of the first rod portion. The first limiting portion and the second limiting portion are spaced apart. The first limiting portion has a first through hole, and the second limiting portion has a second through hole aligned with the first through hole. The second rod includes a second rod portion and a positioning portion connected to the second rod portion. The positioning portion has a through groove, and the positioning portion is located between the first limiting portion and the second limiting portion, the through groove is located between the first through hole and the second through hole. An inner diameter of the through groove is greater than an inner diameter of the first through hole and an inner diameter of the second through hole. The locking element passes through the first through hole, the through groove and the second through hole, to lock the first rod and the second rod together.

Based on the foregoing, in the connecting rod structure in the present disclosure, the first rod and the second rod may slide relative to each other, to adjust the length of the connecting rod structure. After adjusting the connecting rod structure to a preset length, an operator may lock the first rod and the second rod together using the locking element, to prevent the first rod and the second rod from sliding relative to each other. Therefore, the connecting rod structure in the present disclosure has good reliability.

To make the features and advantages of the present disclosure clear and easy to understand, the following gives a detailed description of embodiments with reference to accompanying drawings.

DETAILED DESCRIPTION

Figure 1:
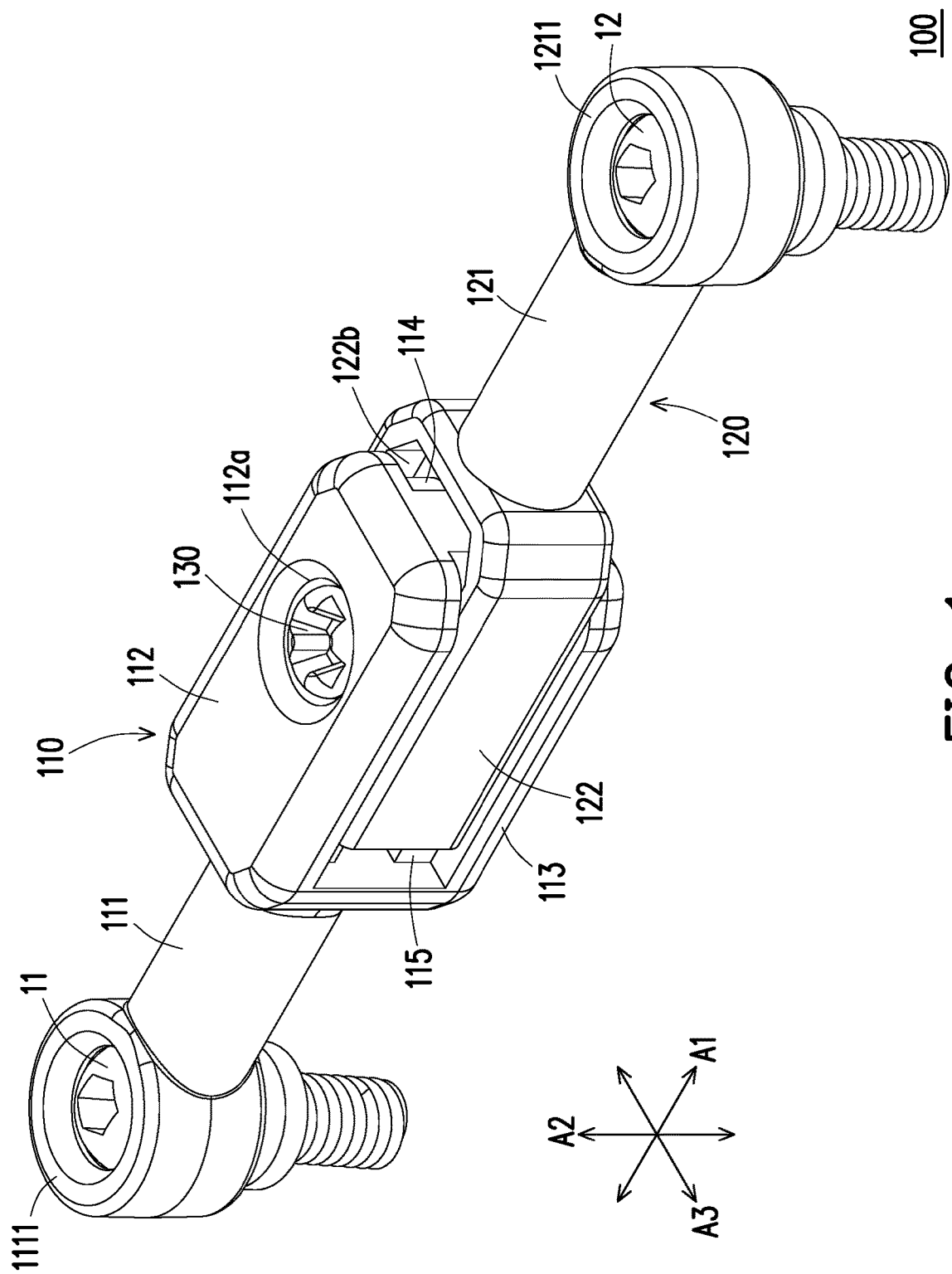
FIG. 1 is a schematic diagram of a connecting rod structure according to an embodiment of the present disclosure.
Figure 2:
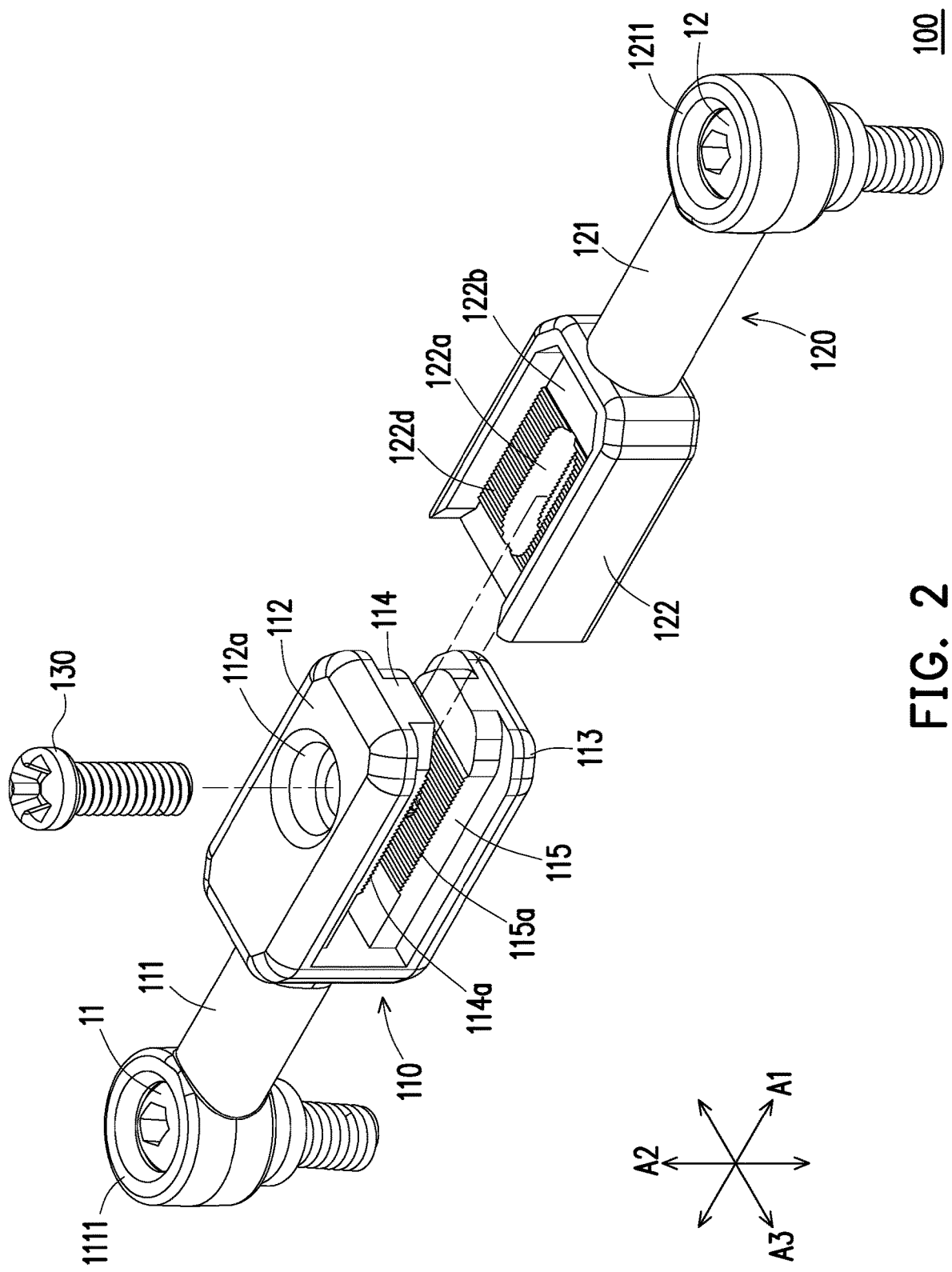
FIG. 2 is a schematic dismantling diagram of a connecting rod structure according to an embodiment of the present disclosure.

FIG. 1 is a schematic diagram of a connecting rod structure according to an embodiment of the present disclosure. FIG. 2 is a schematic dismantling diagram of a connecting rod structure according to an embodiment of the present disclosure. Referring to FIG. 1 and FIG. 2, in this embodiment, a connecting rod structure 100 includes a first rod 110, a second rod 120 and a locking element 130. The first rod 110 is slidably connected to the second rod 120, and the first rod 110 and the second rod 120 may slide relative to each other along a first axial direction A1. After adjusting the connecting rod structure 100 to a preset length through sliding by the first rod 110 and the second rod 120 relative to each other, an operator may lock the first rod 110 and the second rod 120 together using the locking element 130, to limit a degree of freedom of movement of the first rod member 110 and the second rod member 120 along the first axial direction A1. In other words, after the first rod 110 and the second rod 120 are locked together using the locking element 130, the first rod 110 and the second rod 120 cannot slide along the first axial direction A1, and the first rod 110 and the second rod 120 can slide again along the first axial direction A1 until a locking relationship, implemented by the locking element 130, between the first rod 110 and the second rod 120 is relieved.

In particular, the first rod 110 is partially overlapped or in partial contact with the second rod 120. The first rod 110 includes a first rod portion 111, a first limiting portion 112 and a second limiting portion 113. The first limiting portion 112 and the second limiting portion 113 extend from a side of the first rod portion 111, and the first limiting portion 112 and the second limiting portion 113 are spaced apart. A direction in which the first limiting portion 112 and the second limiting portion 113 extend is substantially parallel to the first axial direction A1. In a second axial direction A2 (being perpendicular to the first axial direction A1), the first limiting portion 112 and the second limiting portion 113 are disposed in parallel, and a spacing is kept between the first limiting portion 112 and the second limiting portion 113 to accommodate a part of the second rod 120.

The second rod 120 includes a second rod portion 121 and a positioning portion 122 connected to the second rod portion 121, and the spacing between the first limiting portion 112 and the second limiting portion 113 may be used for accommodate the positioning portion 122. In other words, the positioning portion 122 is located between the first limiting portion 112 and the second limiting portion 113, and in the second axial A2, a location of the first limiting portion 112, a location of the positioning portion 122 and a location of the second limiting portion 113 are overlapped. In addition, in the first axial direction A1, the first rod portion 111 and the second rod portion 121 are respectively located on two opposite sides of the first limiting portion 112, the second limiting portion 113 and the positioning portion 122. When the first rod 110 and the second rod 120 slide relative to each other along the first axial direction A1, because a location of the positioning portion 122 of the second rod 120 is limited between the first limiting portion 112 and the second limiting portion 113 of the first rod 110, the first rod 110 and the second rod 120 does not slide relative to each other along the second axial direction A2, to ensure that the connecting rod structure 100 is not skewed.

It should be specially noted that an end 1111 of the first rod portion 111 of the first rod 110 and an end 1211 of the second rod portion 121 of the second rod 120 are located at two opposite ends of the connecting rod structure 100. The end 1111 of the first rod portion 111 and the end 1211 of the second rod portion 121 may be ball-shaped bases respectively used for receiving a ball socket joint 11 and a ball socket joint 12. Patterns of applications or structures of the end 1111 of the first rod portion 111 and the end 1211 of the second rod portion 121 are not limited in the present disclosure.

Figure 3:
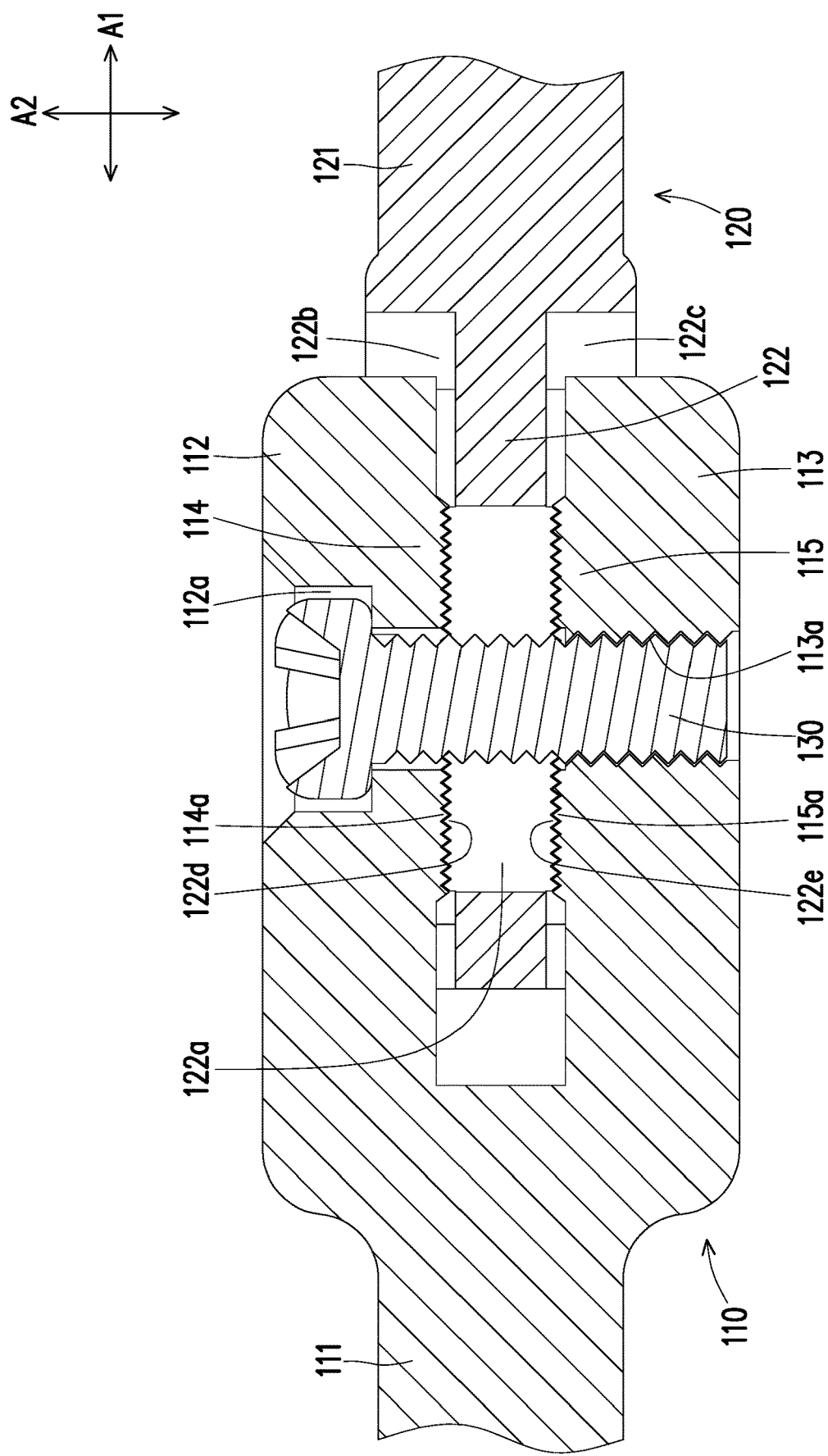
FIG. 3 and FIG. 4 are schematic partial cross-sectional views of a connecting rod structure taken in two different directions according to an embodiment of the present disclosure.
Figure 4:
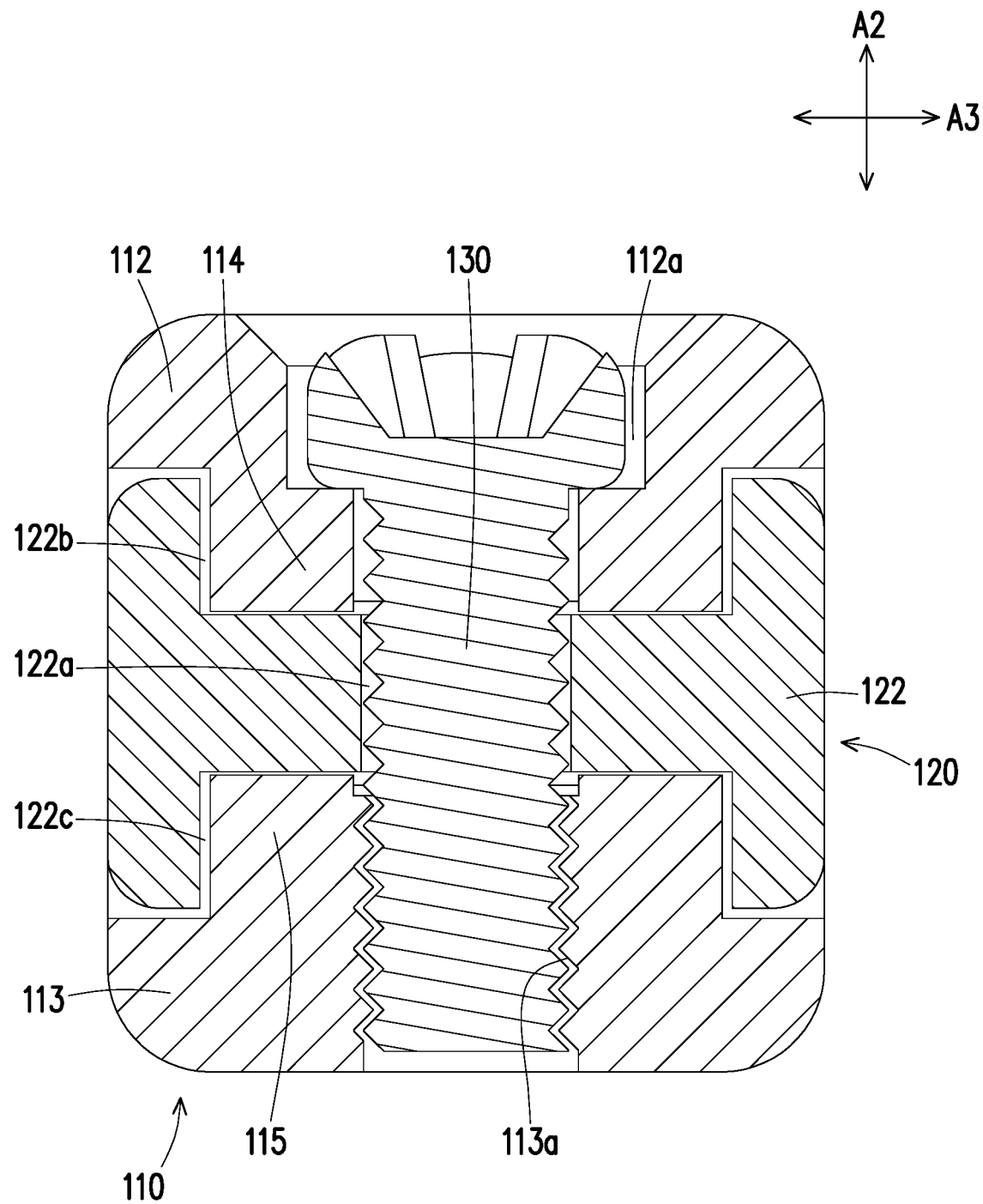

FIG. 3 and FIG. 4 are schematic partial cross-sectional views of a connecting rod structure taken in two different directions according to an embodiment of the present disclosure. Referring to FIG. 1 to FIG. 4, the first limiting portion 112 has a first through hole 112a, and the second limiting portion 113 has a second through hole 113a. In the second axial direction A2, the first through hole 112a is aligned with the second through hole 113a. The positioning portion 122 has a through groove 122a. The through groove 122a is located between the first through hole 112a and the second through hole 113a. In the second axial direction A2, the first through hole 112a and the second through hole 113a are overlapped at the through groove 122a. When the first rod 110 and the second rod 120 slide relative to each other along the first axial direction A1, the positioning portion 122 slides relative to the first limiting portion 112 and the second limiting portion 113, and accordingly, relative locations of the first through hole 112a, the second through hole 113a and the through groove 122a are moved.

In this embodiment, an inner diameter of the through groove 122a is greater than an inner diameter of the first through hole 112a and an inner diameter of the second through hole 113a. In particular, in the first axial direction A1, the inner diameter of the through groove 122a is greater than the inner diameter of the first through hole 112a and the inner diameter of the second through hole 113a, and when the locking element 130 passes through the first through hole 112a, the through groove 122a and the second through hole 113a but does not lock the first rod 110 and the second rod 120 together, the locking element 130 may slide in the through groove 122a along the first axial direction A1. That the locking element 130 does not lock the first rod 110 and the second rod 120 together means that the locking element 130 is not tightened, and that the first limiting portion 112 and the second limiting portion 113 are not tightened on or pressed against two opposite sides of the positioning portion 122. Once the locking element 130 is tightened, the first limiting portion 112 and the second limiting portion 113 are driven by the locking element 130 to be tightened on or pressed against the two opposite sides of the positioning portion 122. In this case, the first rod 110 and the second rod 120 cannot slide along the first axial direction A1.

For example, the locking element 130 may be a screw, and the second through hole 113a may be a screw hole. During a process of tightening the locking element 130, a depth by which the locking element 130 penetrates into the second through hole 113a is deepened, and the locking element 130 exerts a force on the first limiting portion 112 and the second limiting portion 113, so that the first limiting portion 112 and the second limiting portion 113 are tightened on or pressed against the two opposite sides of the positioning portion 122. Therefore, after adjusting the connecting rod structure 100 to a preset length, an operator may lock the first rod 110 and the second rod 120 together by using the locking element 130, to prevent the first rod 110 and the second rod 120 from sliding relative to each other. Therefore, the connecting rod structure 100 has good reliability.

Referring to FIG. 1 to FIG. 4, in this embodiment, the first rod 110 further includes a first protruding limiting portion 114 protruding from the first limiting portion 112. The first protruding limiting portion 114 extends toward the second limiting portion 113, and the first through hole 112a penetrates through the first protruding limiting portion 114. Accordingly, the second limiting portion 113 also has a same or similar structure design with the first limiting portion 112. The first rod 110 further includes a second protruding limiting portion 115 protruding from the second limiting portion 113. The second protruding limiting portion 115 extends toward the first limiting portion 112, and the second through hole 113a penetrates through the second protruding limiting portion 115. In the second axial direction A2, a location of the first protruding limiting portion 114 and a location of the second protruding limiting portion 115 are overlapped. The first protruding limiting portion 114 and the second protruding limiting portion 115 are located between the first limiting portion 112 and the second limiting portion 113, and the first protruding limiting portion 114 and the second protruding limiting portion 115 are spaced apart, to accommodate the positioning portion 122 of the second rod 120.

In addition, the positioning portion 122 has a first positioning recess 122b facing the first limiting portion 112 and a second positioning recess 122c facing the second limiting portion 113. Two opposite ends of the through groove 122a are respectively located in the first positioning recess 122b and the second positioning recess 122c. In particular, a direction in which the first positioning recess 122b and the second positioning recess 122c extend is substantially parallel to the first axial direction A1. The first protruding limiting portion 114 is disposed in the first positioning recess 122b in a sliding way, and the second protruding limiting portion 115 is disposed in the second positioning recess 122c in a sliding way. For example, an external outline of the first protruding limiting portion 114 fits an internal outline of the first positioning recess 122b, and an external outline of the second protruding limiting portion 115 fits an internal outline of the second positioning recess 122c. Therefore, when the first rod 110 and the second rod 120 slide relative to each other along the first axial direction A1, the first rod 110 and the second rod 120 does not slide relative to each other along a third axial direction A3 (being perpendicular to the first axial direction A1 and the second axial direction A2), to ensure that the connecting rod structure 100 is not skewed.

In this embodiment, the first protruding limiting portion 114 has a first limiting serration 114a on a side facing the second protruding limiting portion 115, and the second protruding limiting portion 115 has a second limiting serration 115a on a side facing the first protruding limiting portion 114. In addition, the positioning portion 122 further has a first positioning serration 122d located in the first positioning recess 122b and a second positioning serration 122e located in the second positioning recess 122c, and the two opposite ends of the through groove 122a respectively penetrate through the first positioning serration 122d and the second positioning serration 122e. In particular, the first protruding limiting portion 114 is in contact with the first positioning serration 122d through the first limiting serration 114a, and the second protruding limiting portion 115 is in contact with the second positioning serration 122e through the second limiting serration 115a. Due to the structural interference between the first limiting serration 114a and the first positioning serration 122d, and the structural interference between the second limiting serration 115a and the second positioning serration 122e, the first rod 110 and the second rod 120 do not slide easily relative to each other after being locked together by the locking element 130.

Figure 5:
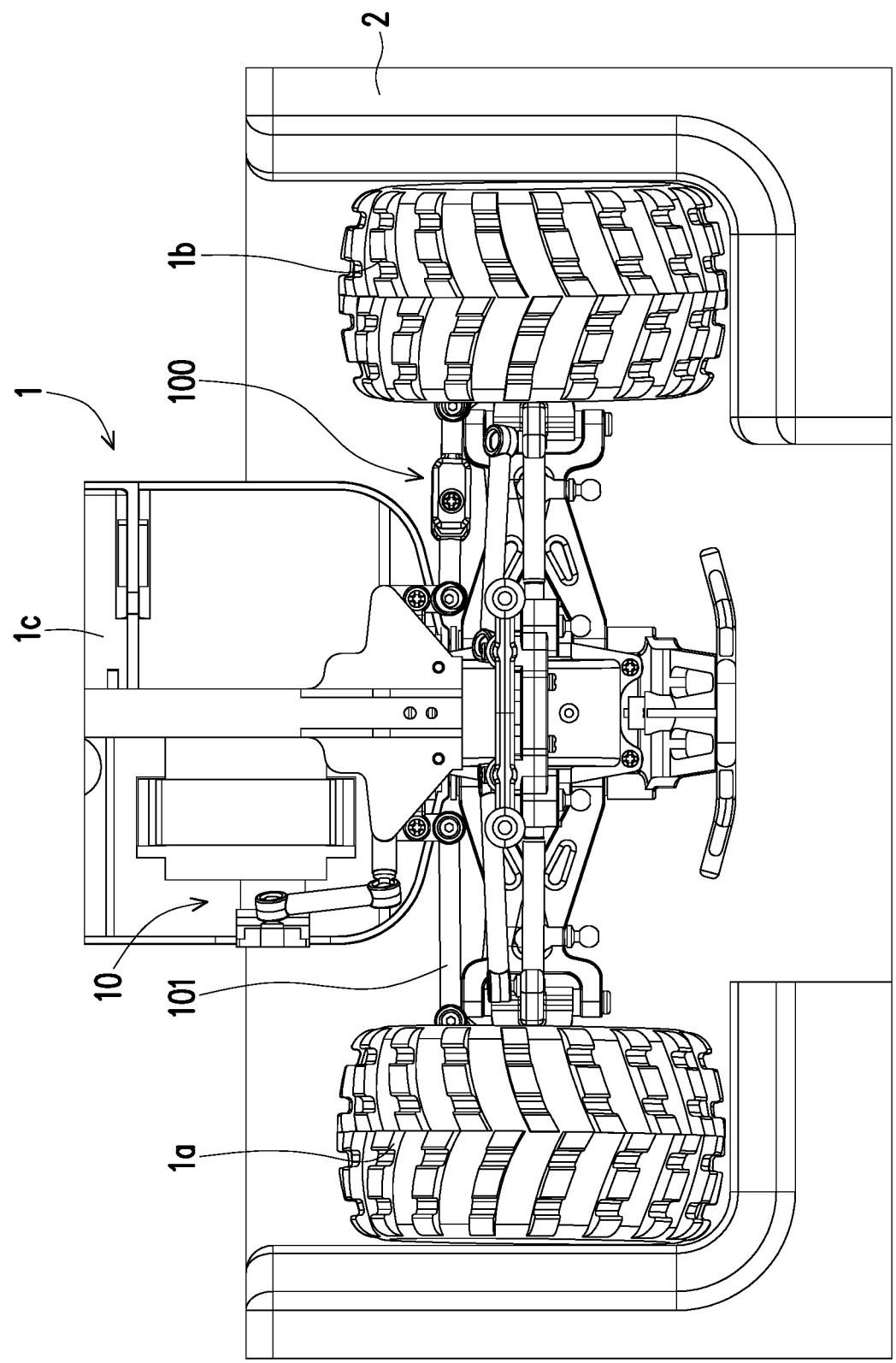
FIG. 5 is a schematic diagram of a connecting rod structure applied to a steering device of a vehicle according to an embodiment of the present disclosure.

FIG. 5 is a schematic diagram of a connecting rod structure applied to a steering device of a vehicle according to an embodiment of the present disclosure. Referring to FIG. 1, FIG. 2 and FIG. 5, the connecting rod structure 100 may be applied to a steering device, a positioning device, an automated device, a transmission device or other mechanized devices. Herein, an example in which the connecting rod structure 100 is applied to a steering device 10 of a vehicle 1 is illustrated. Further, a first wheel 1a and a second wheel 1b are symmetrically disposed on two opposite sides of a chassis 1c of the vehicle 1, and a steering rod 101 and the connecting rod structure 100 are also symmetrically disposed on the chassis 1c of the vehicle 1. A length of the steering rod 101 is fixed, and the steering rod 101 may be configured to drive the first wheel 1a to turn. The length of the connecting rod structure 100 is adjustable, and the connecting rod structure 100 may be configured to drive the second wheel 1b to turn.

During maintenance, adjustment or dismantling and assembly of the steering device 10, the steering rod 101 and the connecting rod structure 100 may have different lengths. Because the length of the steering rod 101 is fixed, the operator may fix the first wheel 1a and the steering rod 101 by using a positioning fixture 2, and then adjust the length of the connecting rod structure 100, so that the connecting rod structure 100 and the steering rod 101 have a same length, so as to prevent the first wheel 1a or the second wheel 1b from being skewed. For the operator, the connecting rod structure 100 is operated simply and directly, so that not only working time spent on maintenance, adjustment or dismantling and assembly is greatly reduced, but also installation errors are reduced.

In conclusion, in the connecting rod structure in the present disclosure, the first rod and the second rod may slide relative to each other, to adjust the length of the connecting rod structure. After adjusting the connecting rod structure to a preset length, an operator may lock the first rod and the second rod together using the locking element, to prevent the first rod and the second rod from sliding relative to each other. Therefore, the connecting rod structure in the present disclosure has good reliability. In addition, the location of the positioning portion of the second rod is limited between the first limiting portion and the second limiting portion that are of the first rod, the first protruding limiting portion of the first rod is located in the first positioning recess of the positioning portion, and the second protruding limiting portion of the first rod is located in the second positioning recess of the positioning portion. Therefore, when the first rod and the second rod slide relative to each other along the first axial direction, the first rod and the second rod does not slide relative to each other along the second axial direction and the third axial direction, to ensure that the connecting rod structure is not skewed.

Although the present disclosure is described with reference to the above embodiments, the embodiments are not intended to limit the present disclosure. A person of ordinary skill in the art may make variations and modifications without departing from the spirit and scope of the present disclosure. Therefore, the protection scope of the present disclosure should be subject to the appended claims.

What is claimed is:

1. A connecting rod structure comprising:
a first rod comprising a first rod portion, a first limiting portion and a second limiting portion, wherein the first limiting portion and the second limiting portion extend from a side of the first rod portion, the first limiting portion and the second limiting portion are spaced apart, the first limiting portion comprises a first through hole, and the second limiting portion comprises a second through hole aligned with the first through hole;
a second rod comprising a second rod portion and a positioning portion connected to the second rod portion, wherein the positioning portion comprises a through groove, and the positioning portion is located between the first limiting portion and the second limiting portion, the through groove is located between the first through hole and the second through hole, and an inner diameter of the through groove is greater than an inner diameter of the first through hole and an inner diameter of the second through hole; and
a locking element passing through the first through hole, the through groove and the second through hole, to lock the first rod and the second rod together,
wherein the first rod further comprises a first protruding limiting portion protruding from the first limiting portion, the first protruding limiting portion extends toward the second limiting portion, and the first through hole penetrates through the first protruding limiting portion.

2. The connecting rod structure according to claim 1, wherein the positioning portion comprises a positioning recess facing the first limiting portion, the first protruding limiting portion is located in the positioning recess, and the through groove is located in the positioning recess.

3. The connecting rod structure according to claim 2, wherein the first protruding limiting portion comprises a limiting serration, the positioning portion further comprises a positioning serration located in the positioning recess, and the limiting serration is in contact with the positioning serration.

4. The connecting rod structure according to claim 3, wherein the first through hole penetrates through the limiting serration, and the through groove penetrates through the positioning serration.

5. The connecting rod structure according to claim 1, wherein the second rod further comprises a second protruding limiting portion protruding from the second limiting portion, the second protruding limiting portion extends toward the first limiting portion, and the second through hole penetrates through the second protruding limiting portion.

6. The connecting rod structure according to claim 5, wherein the positioning portion comprises a positioning recess facing the second limiting portion, the second protruding limiting portion is located in the positioning recess, and the through groove is located in the positioning recess.

7. The connecting rod structure according to claim 6, wherein the second protruding limiting portion comprises a limiting serration, the positioning portion further comprises a positioning serration located in the positioning recess, and the limiting serration is in contact with the positioning serration.

8. The connecting rod structure according to claim 7, wherein the second through hole penetrates through the limiting serration, and the through groove penetrates through the positioning serration.

9. The connecting rod structure according to claim 1, wherein the first through hole and the second through hole are overlapped at the through groove.

* * * * *